United States Patent
Gutman et al.

(10) Patent No.: US 11,569,887 B2
(45) Date of Patent: Jan. 31, 2023

(54) PRECODING MATRIX IDENTIFIER CONFIRMATION FOR POST PROCESSING

(71) Applicant: QUALCOMM Incorporated, San Diego, CA (US)

(72) Inventors: Igor Gutman, Ramat Gan (IL); Shay Landis, Hod Hasharon (IL); Gideon Shlomo Kutz, Ramat Hasharon (IL); Assaf Touboul, Netanya (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/073,162

(22) Filed: Oct. 16, 2020

(65) Prior Publication Data

US 2021/0119682 A1  Apr. 22, 2021

Related U.S. Application Data

(60) Provisional application No. 62/923,456, filed on Oct. 18, 2019.

(51) Int. Cl.
*H04B 7/06* (2006.01)
*H04B 7/0456* (2017.01)
(Continued)

(52) U.S. Cl.
CPC ......... *H04B 7/0639* (2013.01); *H04B 7/0456* (2013.01); *H04B 7/0626* (2013.01);
(Continued)

(58) Field of Classification Search
None
See application file for complete search history.

(56) References Cited

U.S. PATENT DOCUMENTS

2008/0260059 A1    10/2008   Pan
2009/0232510 A1*    9/2009   Gupta .............. H04B 10/25752
                                                              375/296
(Continued)

OTHER PUBLICATIONS

Alina Z., et al., "On Digital Post-Distortion Techniques", IEEE Transactions on Signal Processing, vol. 64, No. 3, Feb. 1, 2016, XP011595375, ISSN: 1053-587X, 001: 10.1109ITSP.2015. 2477806, [retrieved on Dec. 21, 2015], pp. 603-614, Section IV.A; Appendix D, Table II, figure 9.

(Continued)

*Primary Examiner* — Otis L Thompson, Jr.
(74) *Attorney, Agent, or Firm* — Norton Rose Fulbright US LLP/QUALCOMM Incorporated

(57) ABSTRACT

In one aspect, a method for wireless communication includes transmitting a first message indicating a precoding matrix identifier configured to identify a particular precoding matrix for precoding by another wireless communication device for at least one future transmission; and receiving a second message indicating information about whether the particular precoding matrix was or will be used for the at least one future transmission. In another aspect, a method for wireless communication includes receiving a first message indicating a precoding matrix identifier configured to identify a particular precoding matrix for precoding by the wireless communication device for at least one future transmission; and transmitting a second message indicating information about whether the particular precoding matrix was or will be used for precoding for the at least one future transmission. Other aspects and features are also claimed and described.

30 Claims, 7 Drawing Sheets

(51) Int. Cl.
  *H04W 76/27* (2018.01)
  *H04L 5/00* (2006.01)
  *H04W 72/04* (2009.01)
(52) U.S. Cl.
  CPC ......... *H04L 5/0051* (2013.01); *H04W 72/042* (2013.01); *H04W 72/0413* (2013.01); *H04W 76/27* (2018.02)

(56) References Cited

U.S. PATENT DOCUMENTS

| | | | |
|---|---|---|---|
| 2011/0103455 A1* | 5/2011 | Forrester | H04L 25/03006 375/232 |
| 2014/0064348 A1* | 3/2014 | Braz | H04B 1/12 375/350 |
| 2015/0052572 A1* | 2/2015 | Schemmann | H04N 21/234 725/116 |
| 2016/0211856 A1* | 7/2016 | Muhammad | H03M 1/1255 |
| 2019/0052311 A1* | 2/2019 | Murugesu | H04L 27/367 |
| 2019/0190552 A1 | 6/2019 | Sagi et al. | |
| 2021/0067215 A1* | 3/2021 | Song | H04B 7/0639 |

OTHER PUBLICATIONS

International Search Report and Written Opinion—PCT/US2020/056196—ISA/EPO—dated Mar. 2, 2021.
Madeira J., et al., "Iterative Frequency-Domain Detection for MIMO Systems with Strong Nonlinear Distortion Effects", 2018 10th International Congress on Ultra Modern Telecommunications and Control Systems and Workshops (ICUMT), IEEE, Nov. 5, 2018 (Nov. 5, 2018), pp. 1-5, XP033511332, DOI: 10.11 09/ICUMT.2018.8631239 [retrieved on Jan. 31, 2019], The whole document.

* cited by examiner

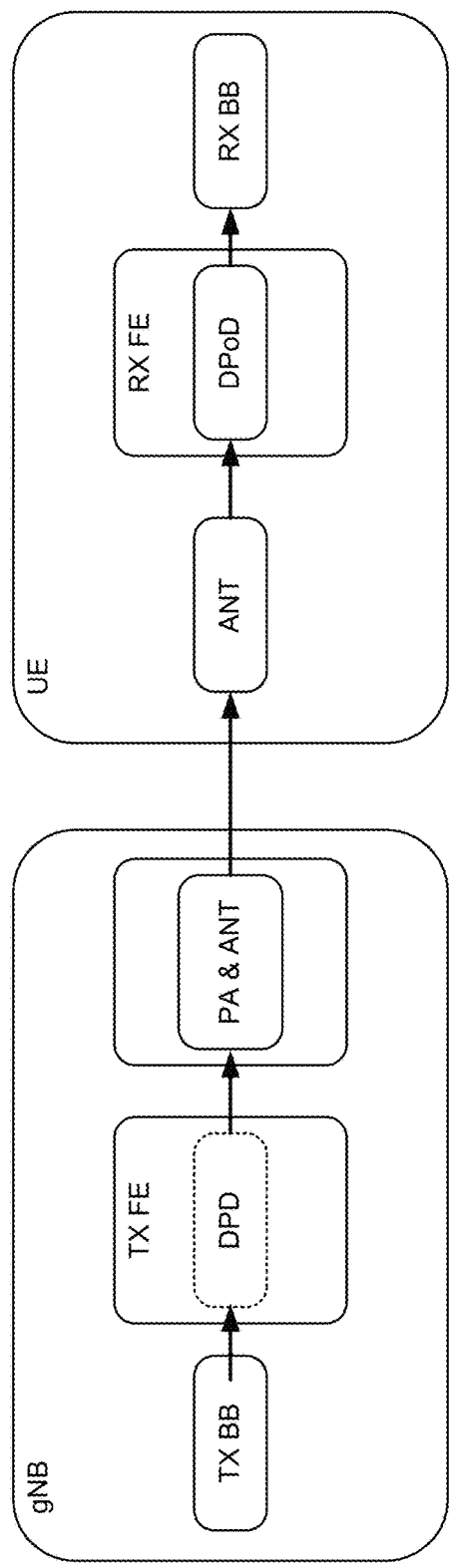
FIG. 4
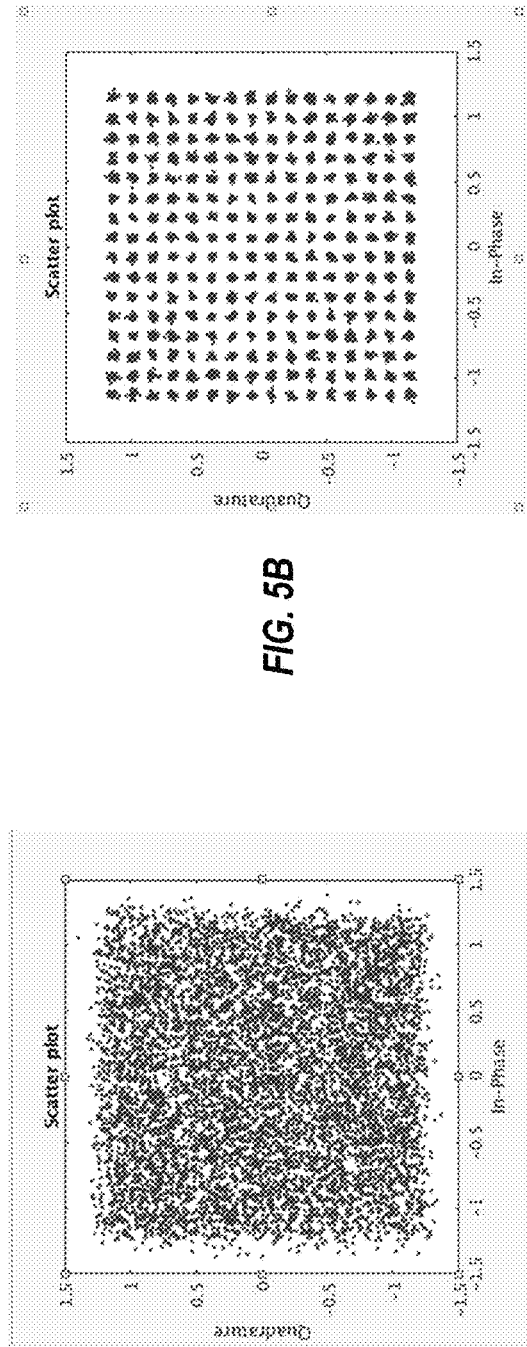
FIG. 5A
FIG. 5B

PRECODING MATRIX IDENTIFIER CONFIRMATION FOR POST PROCESSING

CROSS-REFERENCE TO RELATED APPLICATIONS

This application claims the benefit of U.S. Provisional Patent Application No. 62/923,456, entitled, "PRECODING MATRIX IDENTIFIER CONFIRMATION FOR POST PROCESSING," filed on Oct. 18, 2019, which is expressly incorporated by reference herein in its entirety.

TECHNICAL FIELD

Aspects of the present disclosure relate generally to wireless communication systems, and more particularly, to improved post processing. Certain embodiments of the technology discussed below can enable and provide improved power efficiency and digital post distortion.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes transmitting, by a wireless communication device, a first message indicating a precoding matrix identifier, the precoding matrix identifier configured to identify a particular precoding matrix for precoding by another wireless communication device for at least one future transmission; and receiving, by the wireless communication device, a second message indicating information about whether the particular precoding matrix was or will be used for the at least one future transmission.

In an additional aspect of the disclosure, an apparatus configured for wireless communication is disclosed. The apparatus includes means for transmitting, by a wireless communication device, a first message indicating a precoding matrix identifier, the precoding matrix identifier configured to identify a particular precoding matrix for precoding by another wireless communication device for at least one future transmission; and means for receiving, by the wireless communication device, a second message indicating information about whether the particular precoding matrix was or will be used for the at least one future transmission.

In an additional aspect of the disclosure, a non-transitory computer-readable medium having program code recorded thereon. The program code further includes code to transmit, by a wireless communication device, a first message indicating a precoding matrix identifier, the precoding matrix identifier configured to identify a particular precoding matrix for precoding by another wireless communication device for at least one future transmission; and to receive, by the wireless communication device, a second message indicating information about whether the particular precoding matrix was or will be used for the at least one future transmission.

In an additional aspect of the disclosure, an apparatus configured for wireless communication is disclosed. The apparatus includes at least one processor, and a memory coupled to the processor. The processor is configured to transmit, by a wireless communication device, a first message indicating a precoding matrix identifier, the precoding matrix identifier configured to identify a particular precoding matrix for precoding by another wireless communication device for at least one future transmission; and to receive, by the wireless communication device, a second message indicating information about whether the particular precoding matrix was or will be used for the at least one future transmission.

In another aspect of the disclosure, a method for wireless communication includes receiving, by a wireless communication device, a first message indicating a precoding matrix identifier, the precoding matrix identifier configured to identify a particular precoding matrix for precoding by the wireless communication device for at least one future transmission; and transmitting, by the wireless communication device, a second message indicating information about whether the particular precoding matrix was or will be used for precoding for the at least one future transmission.

In an additional aspect of the disclosure, an apparatus configured for wireless communication is disclosed. The apparatus includes means for receiving, by a wireless communication device, a first message indicating a precoding matrix identifier, the precoding matrix identifier configured to identify a particular precoding matrix for precoding by the wireless communication device for at least one future transmission; and means for transmitting, by the wireless communication device, a second message indicating information about whether the particular precoding matrix was or will be used for precoding for the at least one future transmission.

In an additional aspect of the disclosure, a non-transitory computer-readable medium having program code recorded thereon. The program code further includes code to receive, by a wireless communication device, a first message indicating a precoding matrix identifier, the precoding matrix identifier configured to identify a particular precoding matrix for precoding by the wireless communication device for at least one future transmission; and to transmit, by the wireless communication device, a second message indicating information about whether the particular precoding matrix was or will be used for precoding for the at least one future transmission.

In an additional aspect of the disclosure, an apparatus configured for wireless communication is disclosed. The apparatus includes at least one processor, and a memory coupled to the processor. The processor is configured to receive, by a wireless communication device, a first message indicating a precoding matrix identifier, the precoding matrix identifier configured to identify a particular precoding matrix for precoding by the wireless communication device for at least one future transmission; and to transmit, by the wireless communication device, a second message indicating information about whether the particular precoding matrix was or will be used for precoding for the at least one future transmission.

In another aspect of the disclosure, a method for wireless communication includes transmitting, by a wireless communication device, a first message indicating a precoding matrix identifier, the precoding matrix identifier configured to identify a particular precoding matrix for precoding by another wireless communication device for at least one future transmission; and receiving, by the wireless communication device, a second message indicating information about a utilization of the particular precoding matrix for precoding by the other wireless communication device.

In yet another aspect of the disclosure, a method for wireless communication includes, transmitting, by a wireless communication device, a first message indicating a precoding matrix identifier, the precoding matrix identifier configured to identify a particular precoding matrix for precoding by another wireless communication device; and receiving, by the wireless communication device, a second message indicating information about whether the particular precoding matrix was used for the second message.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is a block diagram illustrating example blocks of a transmitter and receiver in accordance with aspects of the present disclosure.

FIGS. 5A and 5B are a block diagram illustrating example diagrams of non-linear interference.

DETAILED DESCRIPTION

Figure 1:
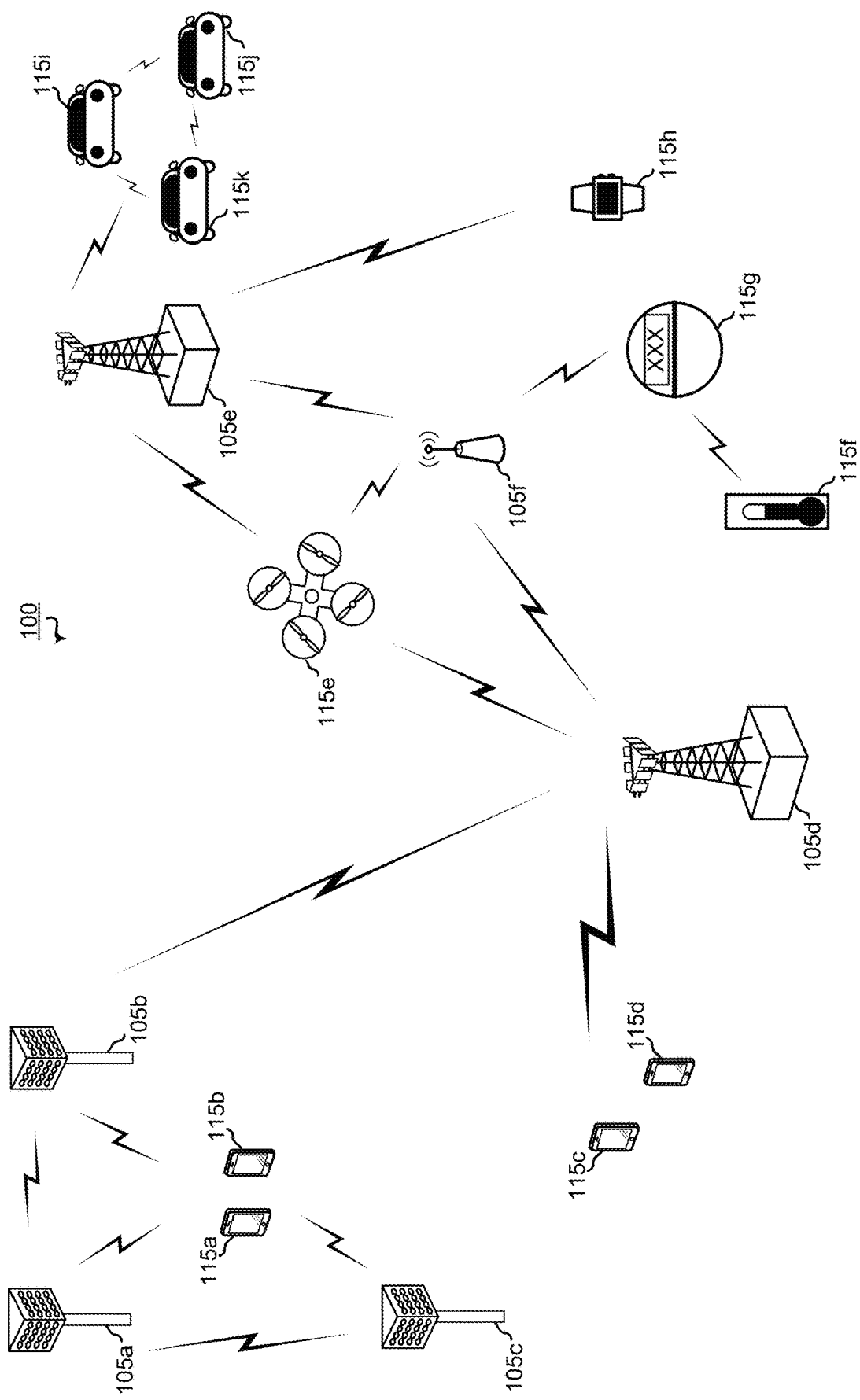
FIG. 1 is a block diagram illustrating details of a wireless communication system according to some embodiments of the present disclosure.

The detailed description is related to enhanced signaling of transmission settings or parameters for post processing for wireless communication, such as fifth generation wireless new radio (5G NR) systems. The enhanced signaling of transmission settings or parameters for post processing may be utilized for high frequency and/or "narrow" beam communications to enable transmission efficiency improvements for wireless communication. The signaling enhancements may include transmitting device confirmation of non-linear distortion information for improved post processing, such as digital post distortion (DPoD) processing. The improved post processing may enable transmissions to be transmitted with increased power efficiency.

Conventionally, wireless networks, such as LTE and 5G, utilize digital pre-distortion (DPD) processing and address non-linear distortion and its effects, such as in and out-of-band interference, at the transmitter side. Alternatively, some systems may employ a user equipment (UE) or receiver based DPoD system. For example, a UE monitors channel quality and determines a precoding matrix to be used for transmission precoding, such as beamforming. The UE signals the precoding matrix to the transmitting device, the network entity (e.g., base station), by a precoding matrix identifier (PMI). The transmitting device or base station then uses the precoding matrix identified based on the PMI to process data for a transmission. When the transmission is received by the UE, the UE uses the previously signaled precoding matrix to perform DPoD and compensate for the non-linear distortions caused by the transmitter during generation and transmission. However, such conventional DPD and DPoD schemes utilize significant power and processing resources, as compared to the disclosed post processing schemes. Thus, conventional DPD and DPoD schemes may be power and processing inefficient and lack flexibility and adaptability.

The described techniques relate to improved methods, systems, devices, and apparatuses that support PMI confirmation. For example, a transmitting device may transmit information which confirms whether a previously indicated precoding matrix identified by PMI will be or was used in processing a transmission. The PMI confirmation may indicate, identify, or include a PMI. As an example, in 5G NR, PMI confirmation may enable reduced power operation, such as improved power transmission efficiency. Such PMI confirmation techniques may enable enhanced operation and flexibility in wireless communication, such as 5G NR. Accordingly, such techniques may increase device performance, reduce device cost, and increase reliability of data sessions and voice calls.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an orthogonal frequency division multiplexing (OFDM)-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/$km^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable transmission time intervals (TTIs) for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
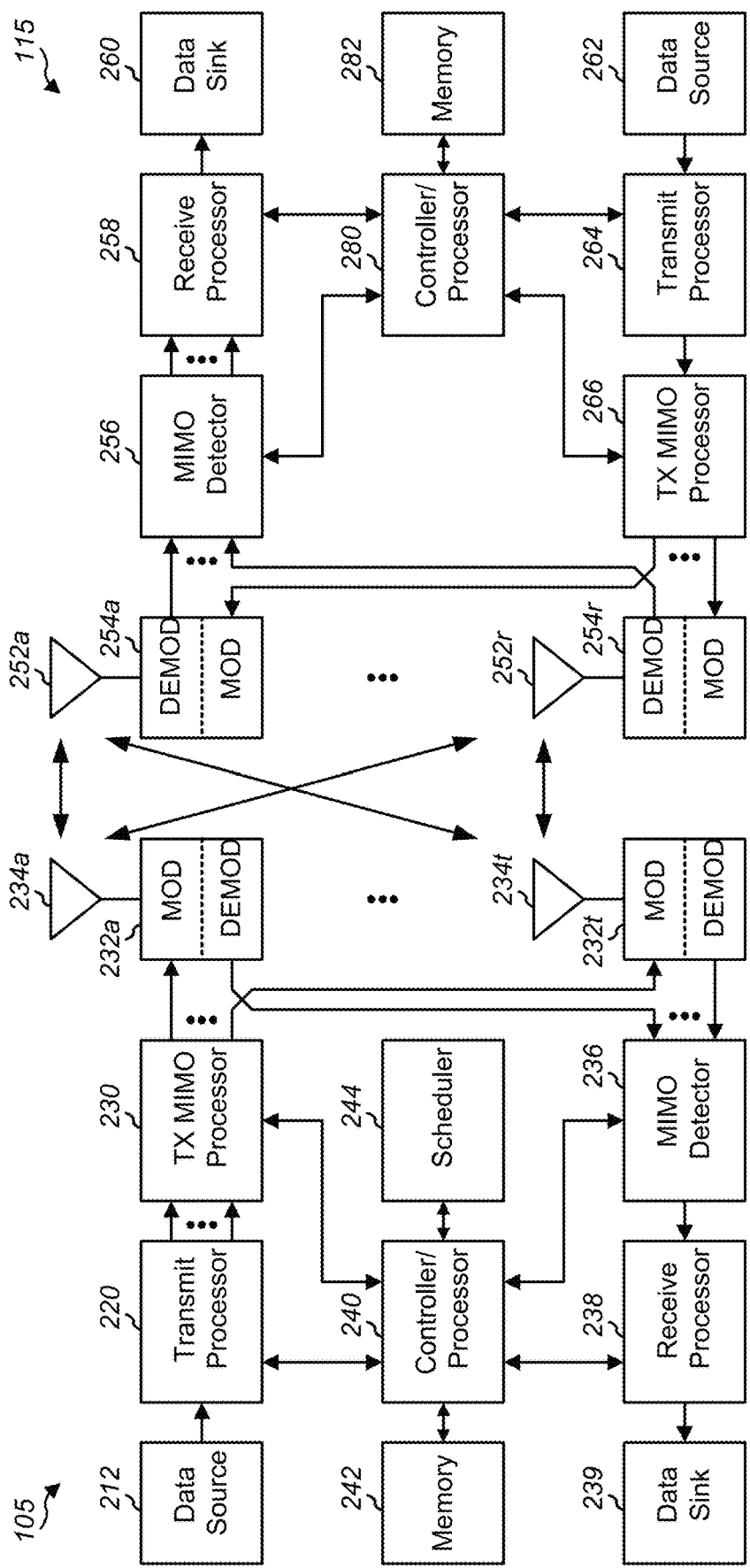
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 6 and 7, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

The utilization efficiency of radiated power plays a significant role in wireless system design. As wireless transmitters include non-linear components, such as power amplifiers, the wireless transmitters will distort a signal during generation and transmission. For example, high-power amplifiers (HPA) with limited linear dynamic range (DR) will distort a transmitted signal due to high Peak-to-Average Power Ratio (PAPR).

The non-linear distortions may be classified as in-band distortion, which affects the communication link performance for mutual information (MI) and/or error vector magnitude (EVM), and out-of-band distortion, which dictates an amount of adjacent channel interference (ACI). The ACI indicates how much adjacent channels are "polluted" by a transmission on a selected or desired channel. In order to avoid such non-linear distortions, power back-off (BO) has been used in conventional systems power amplification. However, increasing the power BO to reduce or avoid non-linear distortion tends to decrease the power efficiency and the power that is transmitted to the channel.

One conventional complementary method to using power BO to control non-linear distortion is to use a pre-distorter, such as a digital pre-distorter (DPD) in the transmitter's front end, such as a digital front end (DFE). Utilizing a DPD may enable a target amount of non-linear distortion, (e.g., a target amount of in-band distortion, out-of-band distortion, or both) to be achieved with a lower power BO level, as compared to not utilizing DPD, and hence the efficiency of the PA and the radiated power is improved.

However, while the DPD improves the in-band (e.g., in-DR) non-linear effect, the DPD doesn't solve all effects caused by non-linear distortion. For example, DPD may introduce a non-linear clipping effect and/or it does not solve a clipping effect caused by the reduction of the power BO value. Such clipping related drawbacks limit the DPD's effectivity, and hence the gains from utilizing DPD for power efficiency are limited. As an illustrative example, the clipping effects may limit the ability for DPD to achieve the gains required or specified for operations in high power regions, such as a cell edge or perimeter.

Alternatively, other techniques have been proposed to solve such in-band interference. One such technique is to perform digital post distortion (DPoD) cleaning. As a generalization and as compared to DPD, in DPoP the non-linear distortions are handled in the receiver and the transmitter processing is reduced. A benefit of using DPoD as compared to using DPD is that unlike the DPD, the DPoD improves the in-band effects that are caused by the out-of-band non-linear effects, such as the clipping effect. Thus, DPoD may enable improved performance in high power regions and regions that are susceptible to poor performance and/or clipping, such as at an edge of a cell.

As an illustrative example, in LTE and 5G-SUB6 (FR1), it can be a challenge to meet out-of-band emissions requirements (e.g., 45 decibels (dB)) set by governments and/or standards bodies, and therefore even with DPD and other methods (such as crest factor reduction CFR)), the amount of power BO to meet the out-of-band emissions requirements is high, such as up to 10-12 dB+.

In millimeter wave (mmWave) and 5G NR, this challenge is reduced or nearly eliminated as the out-of-band emissions requirements are loosed as compared to LTE and 5G-SUB6 (e.g., ~15 dB instead of ~45 dB). Therefore, there are new opportunities available for PA efficiency optimization, such as by further reducing the power BO and dealing with in-band non-linear interference by DPoD.

To perform DPoD, a receiver must know the non-linear operator used during processing of the signal. The complexity required to estimate the non-linear distortions and operator is high or near impossible because of signal processing techniques, such as the use of Inverse Discrete Fourier transforms in OFDM. Thus, information for indicating or identifying the non-linear operator used in signal processing must be known to the receiving device. In conventional DPoD, a UE determines the non-linear operator, such as a precoding matrix, and provides information indicating the non-linear operator, such as a precoding matrix identifier, to the base station which identifies or indicated the determined non-linear operator (e.g., precoding matrix). The base station then uses the non-linear operator identified by the UE based on the information indicating the non-linear operator to generate and process the signal. For example, a precoding matrix may be used to determine signal direction, signal shaping, and/or beamforming. The UE determines which precoding matrix the base station should use for transmission in advance based on channel determinations and estimates. However, such conventional DPoD techniques do not account for changes in conditions or channel determination or estimates made by the base station, and thus limit a flexibility of the base station to determine the non-linear operator, such as select another precoding matrix for pre-coding.

Systems and methods described herein are directed to non-linear operator confirmation for post processing improvements for wireless systems. For example, a PMI confirmation may be utilized by a transmitting device to indicate to a receiving device that a previously signaled precoding matrix, such as signaled by PMI, is/was used or not. In some implementations, the PMI confirmation is a 1 bit indicator or flag which is configured to indicate whether the PMI will be/was used or will not be/was not used. In other implementations, the PMI confirmation is a second PMI which indicates or identifies a second precoding matrix that was actually used or will be used by the transmitting device. Alternatively, the PMI confirmation may include the second precoding matrix, that is the matrix values themselves, in some other implementations. Such transmission confirmation information may enable improved post processing, such as DPoD. As an example, in 5G NR, DPoD may enable reduced power transmissions, improved signal propagation, and/or high mobility operations. Such transmission confirmation information may enable enhanced operation and flexibility in wireless communication, such as 5G NR. Accordingly, such systems and methods may increase device performance, reduce device cost, and increase reliability of data sessions and voice calls.

Figure 3:
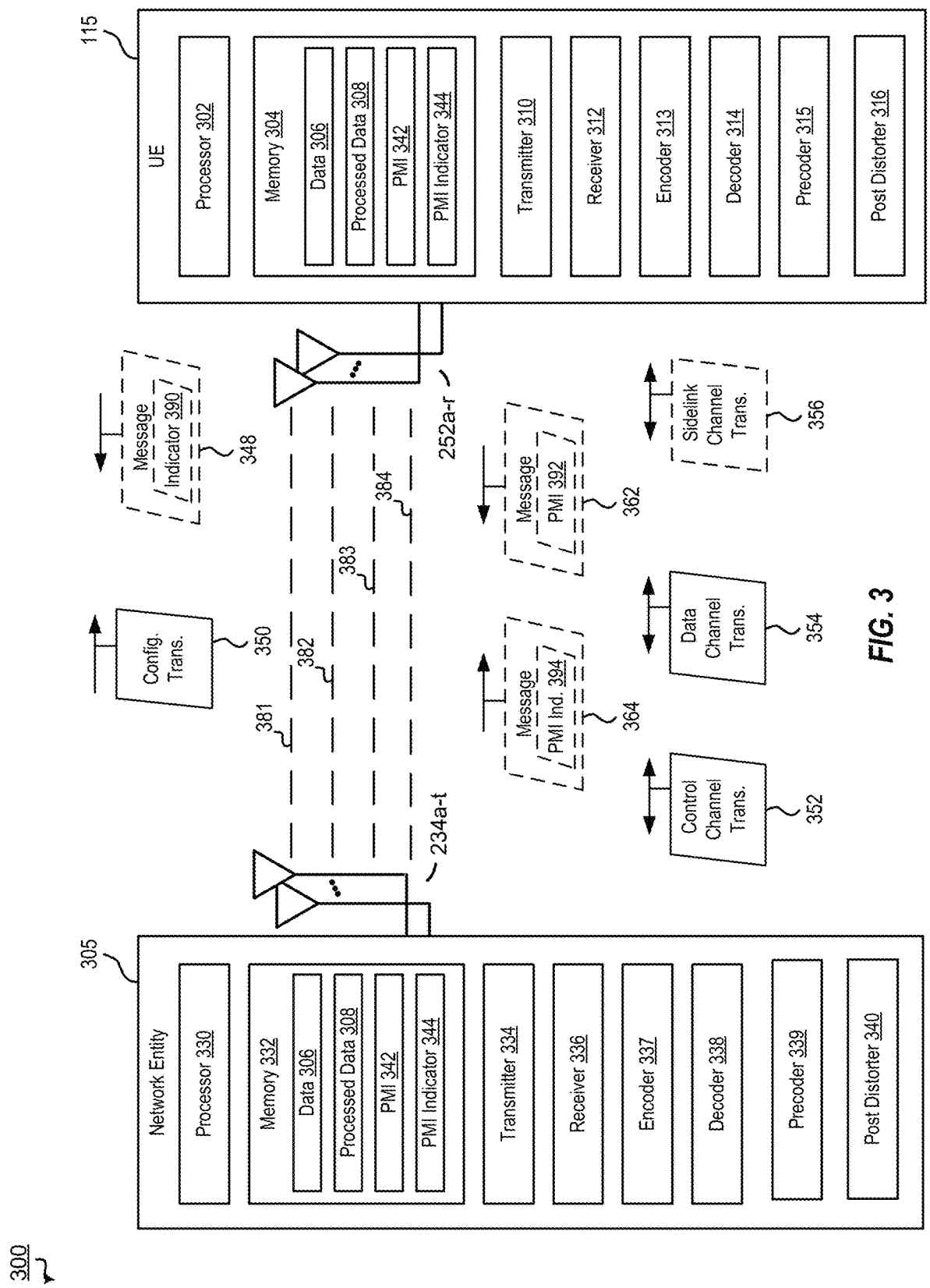
FIG. 3 is a block diagram illustrating an example of a wireless communications system that enables enhanced digital post distortion in accordance with aspects of the present disclosure.

FIG. 3 illustrates an example of a wireless communications system 300 that supports PMI confirmation and post processing enhancements in accordance with aspects of the present disclosure. In some examples, wireless communications system 300 may implement aspects of wireless communication system 100. For example, wireless communications system 300 may include UE 115 and network entity 305. PMI confirmation and post processing enhancements may enable improved network performance. For example, PMI confirmation may enable improved DPoD, and improved DPoD may enable power savings and reduced costs.

Network entity 305 and UE 115 may be configured to communicate via frequency bands, such as FR1 having a frequency of 410 to 7125 MHz or FR2 having a frequency of 24250 to 52600 MHz for mm-Wave. It is noted that sub-carrier spacing (SCS) may be equal to 15, 30, 60, or 120 kHz for some data channels. Network entity 305 and UE 115 may be configured to communicate via one or more component carriers (CCs), such as representative first CC 381, second CC 382, third CC 383, and fourth CC 384. Although four CCs are shown, this is for illustration only, more or fewer than four CCs may be used. One or more CCs may be used to communicate control channel transmissions, data channel transmissions, and/or sidelink channel transmissions.

For example, control channel and data channel transmissions 352 and 354 may be transmitted between UE 115 and network entity 305. Such transmissions may include a Physical Downlink Control Channel (PDCCH), a Physical Downlink Shared Channel (PDSCH), a Physical Uplink Control Channel (PUCCH), or a Physical Uplink Shared Channel (PUSCH). Optionally, sidelink channel transmissions 356 may be transmitted between UE 115 and network entity 305 or between UE 115 and another network device (e.g., another UE). Such sidelink channel transmissions may include a Physical Sidelink Control Channel (PSCCH), a Physical Sidelink Shared Channel (PSSCH), or a Physical Sidelink Feedback Channel (PSFCH). The above transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, hybrid automatic repeat request (HARQ) process, transmission configuration indicator (TCI) state, reference signal (RS), control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entity 305 and UE 115. For example, the control information may be communicated suing MAC-CE transmissions, radio resource control (RRC) transmissions, DCI, transmissions, another transmission, or a combination thereof.

UE 115 includes processor 302, memory 304, transmitter 310, receiver 312, encoder, 313, decoder 314, precoder 315, post distorter 316, and antennas 252a-r. Processor 302 may be configured to execute instructions stored at memory 304 to perform the operations described herein. In some implementations, processor 302 includes or corresponds to controller/processor 280, and memory 304 includes or corresponds to memory 282. Memory 304 may also be configured to store data 306, processed data 308, precoding matrix identifier (PMI) data 342, PMI indicator data 344, or a combination thereof, as further described herein.

The data 306 includes or corresponds to data unencoded data or decoded data. The processed data 308 includes or corresponds to data that has been post processed, such a processed by the post distorter 316 (e.g., a digital post distorter (DPoD)). The PMI data 342 may include or correspond to data associated with or indicating a PMI. For example, the PMI data 342 may indicate a PMI. To illustrate, the PMI data 342 may include or indicate an identifier, codebook entry, or table entry for a particular PMI, and the matrix values for the particular PMI may be obtained or retrieved based on the identifier. As another example, the PMI data 342 may include a PMI. To illustrate, the PMI data 342 includes or indicates matrix values of a particular PMI.

The PMI indicator data 344 may include or correspond to a confirmation indicator for a PMI that was previously signaled. The PMI indicator data 344 may be configured to indicate whether the previously signaled PMI was actually used precoding, whether the previously signaled PMI should be used for post processing, or both. The PMI indicator data 344 may include or correspond to an indicator bit or bits, an alternative PMI, or an actual precoding matrix (i.e., include matrix values thereof).

Transmitter 310 is configured to transmit data to one or more other devices, and receiver 312 is configured to receive data from one or more other devices. For example, transmitter 310 may transmit data, and receiver 312 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 310 and receiver 312 may be replaced with a transceiver. Additionally, or alternatively, transmitter 310, receiver, 312, or both may include or correspond to one or more components of UE 115 described with reference to FIG. 2.

Encoder 313 and decoder 314 may be configured to encode and decode data for transmissions, such as encode data independent of a predistorter (e.g., a digital predistorter (DPD) to compensate for non-linear distortion). In other implementations, encoder 313 encodes data after predistortion processing by a DPD. Precoder 315 may be configured to precode data for transmissions. For example, the precoder 315 is configured to code data for front end processing, such as directional processing, beam shaping, beamforming, etc. Additionally, the precoder 315 may be configured to determine whether to use an indicated PMI or to use an alternative PMI. To illustrate, the precoder 315 may be configured to determine to use an alternative PMI, such as a second determined PMI or a default/reference PMI (e.g., preset or preconfigured PMI) based on one or more channel quality indicators. The precoder 315 may perform one or more operations described with reference to FIG. 4.

Post distorter 316 (e.g., DPoD) may be configured to post process data from transmissions based on a PMI indicator. For example, post distorter 316 is configured compensate for non-linear distortion caused by power amplification and/or front end processing of another device. Additionally, the post distorter 316 may be configured to post process data from transmissions based on the PMI indicator and the PMI. For example, the post distorter 316 may be configured to use the PMI previously signaled by PMI data 342 and then confirmed by the PMI confirmation indicator of the PMI indicator data 344. The post distorter 316 may perform one or more operations described with reference to FIG. 4.

Network entity 305 includes processor 330, memory 332, transmitter 334, receiver 336, encoder 335, decoder 338, precoder 339, post distorter 340, and antennas 234a-t. Processor 330 may be configured to execute instructions stores at memory 332 to perform the operations described herein. In some implementations, processor 330 includes or corresponds to controller/processor 240, and memory 332 includes or corresponds to memory 242. Memory 332 may be configured to store data 306, processed data 308, PMI data 342, PMI indicator data 344, or a combination thereof, similar to the UE 115 and as further described herein.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, network entity 305 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver, 336, or both may include or correspond to one or more components of network entity 305 described with reference to FIG. 2. Encoder 335, decoder 338, precoder 339, and post distorter 340 may include the same functionality as described with reference to encoder 313, decoder 314, precoder 315, and post distorter 316, respectively.

During operation of wireless communications system 300, network entity 305 may determine that UE 115 has PMI confirmation capability. For example, UE 115 may transmit a message 348 that includes a PMI confirmation capability indicator 390. Indicator 390 may indicate PMI confirmation capability or a particular type of post processing, such as DPoD. In some implementations, network entity 305 sends control information to indicate to UE 115 that PMI confirmation and/or a particular type of post processing is to be used. For example, in some implementations, message 348 (or another message, such as configuration transmission 350) is transmitted by the network entity 305. The configuration transmission 350 may include or indicate to use PMI confirmation or to adjust or implement a setting of a particular type of distortion processing or post processing.

During operation, devices of wireless communications system 300, transmit control, data, and/or sidelink channel transmissions to other devices of wireless communications system 300. For example, UE 115 and a base station (e.g., 305) may transmit control and data information on control and data channels. One or more of the transmissions may include quality indicators, such as control channel quality indicators and/or data channel quality indicators. The quality indicators may be monitored by UE 115 and/or stored.

In some implementations, UE 115 and network entity 305 initiate a data session, such as a voice call. The data session may be setup using control and/or data channel transmissions. During setup of the data session, upon joining the network, or upon a condition being satisfied during the data session, PMI confirmation information may be transmitted or determined. For example, the network entity 305 may transmit information indicating a particular distortion processing or post processing mode. As another example, the PMI confirmation information may be determined based on channel quality data, device mobility, transmission frequency, battery level, etc., or a combination thereof.

After the UE 115 or network entity 305 determine to use PMI confirmation, one or more devices may begin to perform PMI confirmation operations. For example, the UE 115 may monitor network, device, and/or channel conditions and determine a particular PMI 392 to be used by the network entity 305. UE 115 transmits a first message 362 to network entity 305 including or indicating the determined particular PMI 392. The particular PMI 392 is signaled to the network entity 305 by the UE 115 for the network entity 305 to use in front end processing, such as in precoding. First message 362 may include or correspond to a control message or control channel transmission, such as a channel state frequency (CSF) report, a radio resource control (RRC) message, or uplink control information (UCI). In some implementations, first message 362 includes or corresponds to in a channel state frequency (CSF) report.

Network entity 305 may then determine whether to use the particular PMI 392 signaled by the UE 115 for a second message 364, a third message, or both. Network entity 305 then indicates to the UE 115 which precoding matrix the network entity 305 used by PMI indicator 394 (e.g., PMI confirmation indicator). For example, the network entity 305 indicates whether the previously sent PMI 392 was used or not by a flag or bit (e.g., flag bit). To illustrate, a bit value of 0 indicates that the PMI indicated by the PMI data 342 was used or will be used for one or more transmissions and a bit value of 1 indicates that the PMI indicated by the PMI data 342 was not used or will not be used for one or more transmissions. As another example, PMI indicator 394 corresponds to a sequence of bits, such as three bits, and is used to indicate that a different, second PMI was used. As yet another example, PMI indicator 394 corresponds to a second PMI and the network entity 305 may indicate the second PMI by including second PMI data in the second message 364.

The PMI confirmation information may be included in the same message/transmission it modifies, such as the second message 364, or in another later message/transmission, such as a third message sent from network entity 305 to UE 115. To illustrate, the PMI confirmation information (e.g., 344, such as a bit or bits thereof) or a separate indicator (e.g., a bit or bits of another field) may indicate that the second PMI is for the second message 364. As another illustration, the PMI confirmation is included in the second message 364 and provides an indicator for the third message. The second message and/or the third message may include or correspond to data or control channel transmissions. Exemplary data channel transmissions include a physical downlink shared channel (PDSCH), a channel state information reference signal (CSI-RS), a physical uplink shared channel (PUSCH), or a sounding reference signal (SRS). Exemplary data channel transmissions include a radio resource control (RRC) message or downlink control information (DCI).

In the alternative to using an indicator in the same message as the PMI indicator 394 to signal which message/slot the PMI indicator 394 corresponds to, a device may determine which message/slot corresponds to the PMI indicator 394 (e.g., PMI confirmation information) based on preset or configurable settings. For example, each PMI indicator 394 may correspond to PMI confirmation information for a next message or slot or some other future message or slot. The particular message/slot may be preset or configurable by RRC message. Additional PMI confirmation details are described with reference to FIG. 4.

UE 115 and network entity 305 may continue to perform PMI confirmation operations until the end of the data session, a particular condition is satisfied, or until a change in a parameter is determined, such as a change in channel quality data, device mobility, transmission frequency, battery level, etc., or a combination thereof.

Thus, FIG. 3 describes PMI confirmation operations. Using PMI confirmation to transmit data may enable improved post processing and network performance. Using PMI confirmation and DPoD enables a network to increase power efficiency and improve reliability.

FIG. 4 illustrates an example of a network 400 that supports post processing enhancements in accordance with aspects of the present disclosure. In some examples, a gNB and a UE may implement aspects of wireless communication system 100 or 300. For example, a gNB may indicate or confirm a precoding matrix that was actually used. The confirmed precoding matrix may be used by the UE for post processing, such as DPoD. Using a confirmed precoding matrix may enable improved performance and increased reliability.

FIG. 4 illustrates a particular processing flow for DPoD. In the example processing flow for DPoD in FIG. 4, the gNB generates a BB signal. The baseband signal is processed by a front end. For example, a PA of the RF circuitry may cause non-linear distortion when amplifying the front end signal for transmission by the RF circuitry. In some implementations, predistortion, such as digital predistortion, is not used, such as not used to correct for non-linear distortion caused by the RF circuitry. In other implementations, predistortion is used to correct for non-linear distortion caused by the RF circuitry. The gNB transmits a RF signal to the UE.

The RF signal includes a PMI confirmation indication or identifier to indicate to the UE that the previously indicate PMI was used or was not used. The UE determines to perform post processing based on the PMI confirmation indicator, that is based on whether the PMI was not used. The UE may perform a particular type of post processing or use a particular setting or mode of post processing based on the PMI confirmation indication. In the example of FIG. 4, the UE performs digital post distortion processing based on the confirmation indicator. For example, the UE may perform digital post distortion when the PMI confirmation indicates that the previously sent PMI was used. As another example, the UE may perform digital post distortion when the PMI confirmation indicates that the previously sent PMI was used. To illustrate, the PMI confirmation indicator may include or indicate a second PMI that was used in precoding the transmission. Including or indicating a second PMI that was used may indicate that the first PMI was not used.

An illustrative, non-limiting example of digital post distortion, an example DPoD equation is given below in Equation 1:

$$Y = H \cdot G(P \cdot S) + N = H \cdot G(S^*) + N$$

In the above equation, H denotes the channel, P denotes the precoding matrix, S denotes the signal pilots, N denotes the thermal noise, and G denotes the non-linear distortion. Once the receiver obtains the precoding matrix (P) and the signal pilot or pilots (S), the receiver can estimate the non-linear distortion (G). The precoding matrix (P) and the signal pilot (S) may be used (e.g., multiplied or combined) to generate a precoded signal pilot (S*). A signal pilot may also be referred to as a pilot signal. The pilot signal may include a tracking reference signal (TRS), a demodulation reference signal (DMRS), or both.

Figures 6, 7:
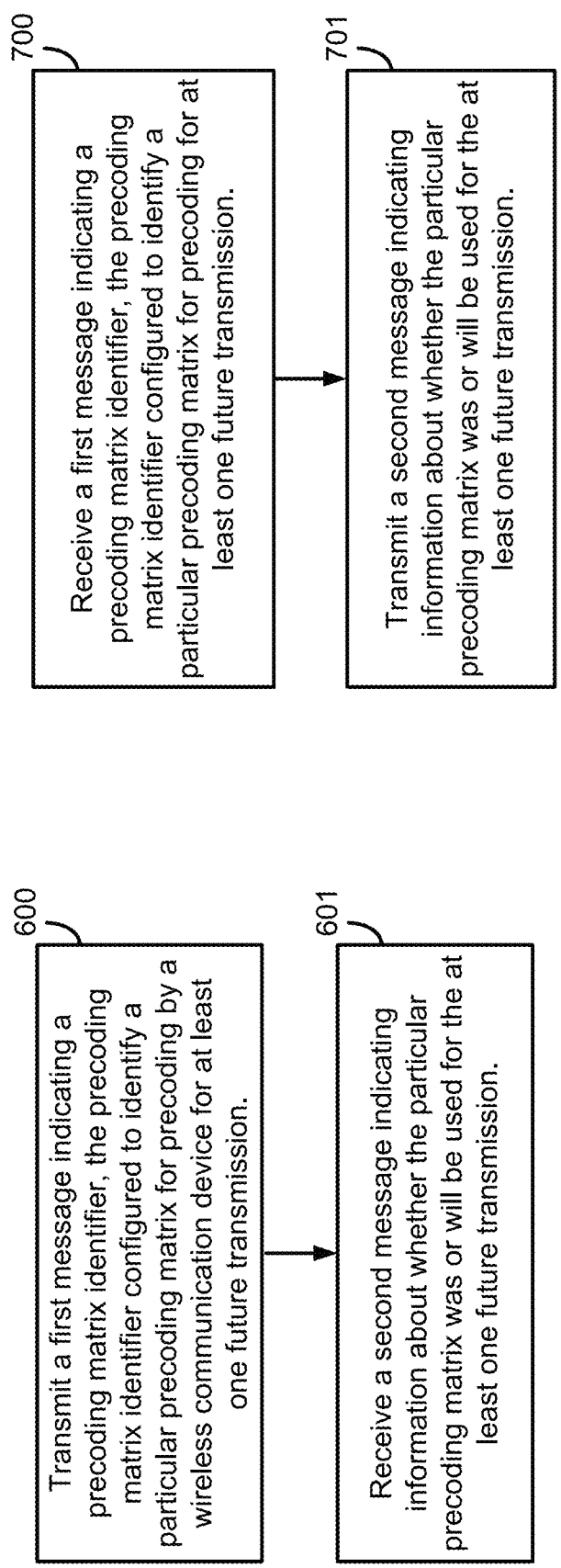
FIG. 6 is a block diagram illustrating example blocks executed by a UE configured according to an aspect of the present disclosure.
FIG. 7 is a block diagram illustrating example blocks executed by a network entity configured according to an aspect of the present disclosure.
Figure 8:
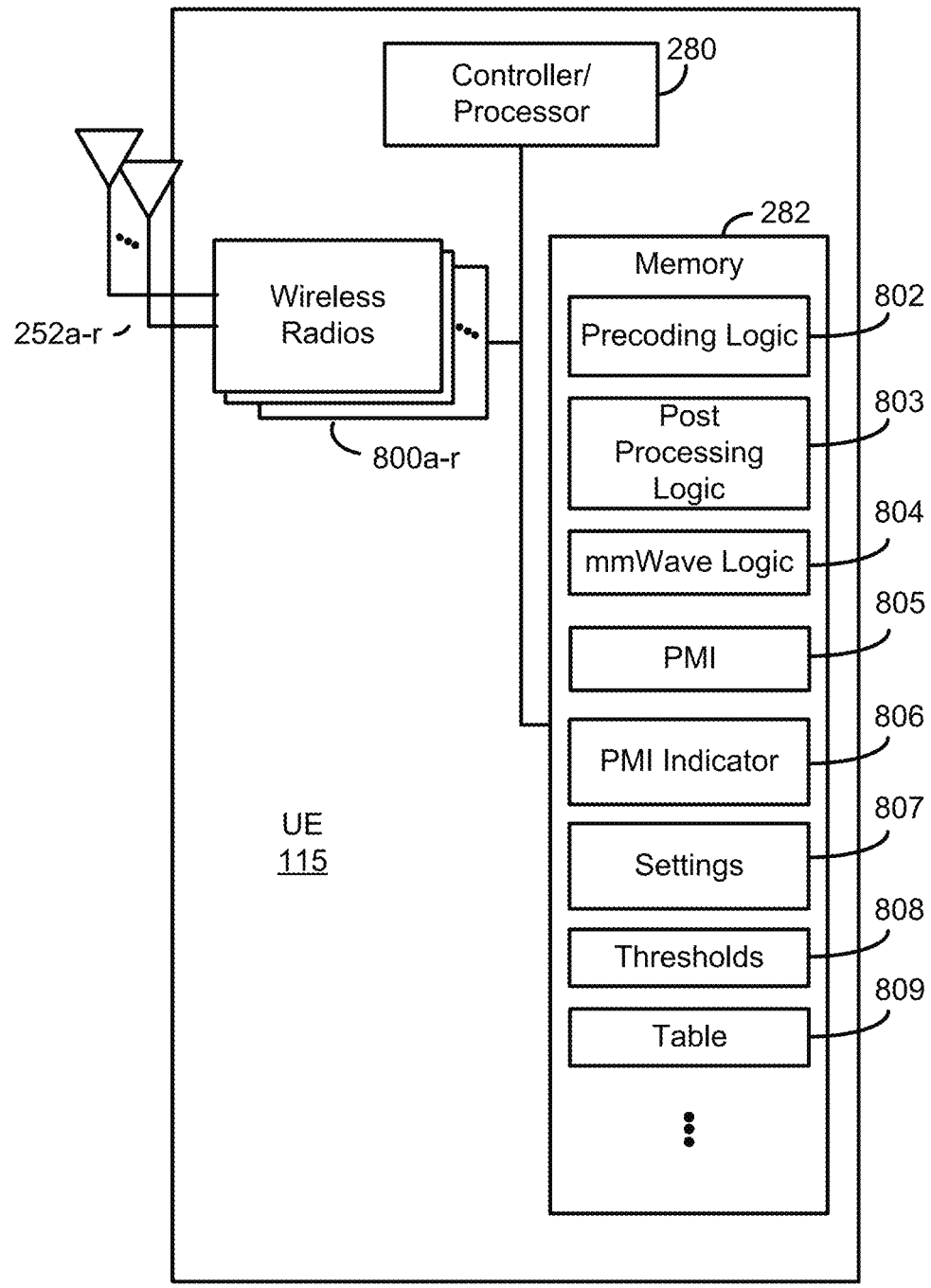
FIG. 8 is a block diagram conceptually illustrating a design of a UE according to some embodiments of the present disclosure.

FIGS. 5A and 5B illustrate examples of In-phase/Quadrature (I/Q) Scatter plots for 256 Quadrature Amplitude Modulation (QAM). FIG. 5A illustrates a first I/Q Scatter plot of a received signal before DPoD; FIG. 5B illustrates a second I/Q Scatter plot of the received signal after DPoD. In FIG. 5A, the in-band distortion is high, such as 18.9 dB EVM. In FIG. 5B, the in-band distortion is reduced, such as 31.8 dB EVM. Although a 256 QAM order is shown, in other implementations other orders of QAM may be used. As DPoD is agnostic to QAM order, other orders of QAM will have reduced in-band distortion from DPoD. Additionally, although DPoD is shown in FIGS. 4, 5A, and 5B, in other implementations the post processing may include one or more channel estimation procedures, time averaging procedures, or a combination thereof, in addition to or in the alternative of DPoD. When precoding information is known at the receiver, an increase in processing gain can be achieved. This can improve performance, when data allocation is more limited. Time averaging may improve device mobility. For example, time averaging processing may improve Doppler spread/shift when network devices are moving relative to one another FIG. 6 is a block diagram illustrating example blocks executed by a UE configured according to an aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 6, memory 282 stores precoding logic 802, post processing logic 803, mmWave logic 804, PMI data 805, PMI indicator data 806, settings 807, thresholds 808, and a table 809.

At block 600, a wireless communication device, such as a UE, transmits a first message indicating a precoding matrix identifier, the precoding matrix identifier configured to identify a particular precoding matrix for precoding by another wireless communication device for at least one future transmission. For example, the UE 115 determines a precoding matrix based on channel quality, selects a PMI which indicates the determined precoding matrix, and transmits the PMI to another device, such as described in FIG. 3 or 4. To illustrate, UE 115 may transmit first message 362 including PMI 392 to network entity 305 in a channel state frequency (CSF) report. The CSF report may also include modulation and coding scheme (MCS) information, a rank indicator (RI), or both.

The UE 115 may execute, under control of controller/processor 280, precoding logic 802, stored in memory 282. The execution environment of precoding logic 802 provides the functionality for UE 115 to define and perform the PMI confirmation procedures. Additionally, the UE 115 may execute one or more of post processing logic 803 or mmWave logic 804. The execution environment of precoding logic 802 (and optionally post processing logic 803 or mmWave logic 804) defines the different PMI confirmation processes, such as determining to perform PMI confirmation, determining a precoding matrix, selecting a PMI for the precoding matrix, transmitting the PMI to another device, or a combination thereof. To illustrate, UE 115 may determine to operate in a particular PMI confirmation mode based on a configuration message.

At block 601, the UE 115 receives a second message indicating information about whether the particular precoding matrix was or will be used for the at least one future transmission. For example, the UE 115 receives a transmission, such as second message 364, via wireless radios 800a-r and antennas 252a-r. The second message 364 includes PMI confirmation information, PMI indicator 394, and the PMI confirmation information is configured to indicate whether the PMI indicated by the first message 362 was used to precode the second message, precode one or more future messages, or both. The PMI confirmation information may additionally be configured to indicate an alternative PMI and/or whether post processing (e.g., DPoP processing) should be done. The PMI confirmation information may have different forms or types, such as described with reference to FIGS. 3 and 4. The at least one future transmission may include or correspond to the second message, a third message, and/or one or more other future transmissions, as described with reference to FIG. 3.

In some implementations, a particular transmission of the at least one future transmission has an out-of-band interference of 15 decibels (dB) or less. Alternatively, one or more of the transmissions of the at least one future transmission may have an out-of-band interference of less than or equal to 5 dB, 20 dB, 30 dB, 45 dB, or any value there between or any such value as set by a standards body. Additionally, or alternatively, a particular transmission of the at least one future transmission may be a single user multi-input multi-output (SU MIMO) communication. Such SU MIMO transmissions may benefit from increased power efficiency improvements.

The UE 115 may execute additional blocks (or the UE 115 may be configured further perform additional operations) in other implementations. For example, the UE 115 may perform post processing based on the PMI confirmation information. To illustrate, the UE 115 may perform DPoD based on the PMI confirmation information. In a particular implementation, the UE 115 uses the precoding matrix identified by the PMI confirmation information to perform DPoD and to correct for transmission non-linear distortion. Additionally, or alternatively, the UE 115 may perform one or more operations described above.

As another example, the UE 115 may retrieve matrix values from a precoding matrix table based on the information, estimate transmission non-linear interference for a particular transmission (e.g., 394) based on the matrix values to generate an estimated non-linearity value, and process the particular transmission based on the estimated non-linearity value to correct for non-linear distortion.

As yet another example, the UE 115 may transmit PMI confirmation to a base station. To illustrate, UE 115 may receive a third message indicating a second precoding matrix identifier configured to identify a second particular precoding matrix for precoding by the wireless communication device for at least one second future transmission. The UE 115 may also determine whether to use the second particular precoding matrix for a second particular transmission. The UE 115 may process second data based on the second particular planned precoding matrix to generate processed second data and transmit a fourth message indicating second information about whether the second particular precoding matrix will be used for a second transmission. The UE 115 may further transmit the second transmission based on the processed second data, where the information indicates that the particular planned precoding matrix was used to generate the second transmission and that post processing should be performed by the other wireless communication device.

As another example, the UE 115 may perform one or more aspects described below. In a first aspect, the information is or includes precoding matrix identifier (PMI) confirmation information and is configured to indicate that the previously identified particular precoding matrix was either used or not used in the precoding of a particular transmission of the at least one future transmission by the other wireless communication device.

In a second aspect, alone or in combination with one or more of the above aspects, the information is further configured to indicate that the particular precoding matrix should be used for post processing of a particular transmission by the wireless communication device, and the UE 115 further performs post processing of the particular transmission based on the information.

In a third aspect, alone or in combination with one or more of the above aspects, the post processing includes digital post distortion (DPoD).

In a fourth aspect, alone or in combination with one or more of the above aspects, the post processing includes channel estimation procedures, time averaging procedures, or a combination thereof.

In a fifth aspect, alone or in combination with one or more of the above aspects, the information is or includes a one bit identifier configured to indicate that the particular precoding matrix was either used or not used in precoding of a particular transmission by the other wireless communication device.

In a sixth aspect, alone or in combination with one or more of the above aspects, the information is or includes a second precoding matrix identifier configured to indicate a second precoding matrix for precoding, where the second precoding matrix is different from the particular precoding matrix, and where the second precoding matrix was used in precoding of a particular transmission by the other wireless communication device.

In a seventh aspect, alone or in combination with one or more of the above aspects, the information is or includes second precoding matrix data, the second precoding matrix data indicates a plurality of matrix values for a second precoding matrix that is different from the particular precoding matrix.

In an eighth aspect, alone or in combination with one or more of the above aspects, the information is further configured to indicate that no digital post distortion is to be performed by the wireless communication device for the at least one future transmission.

In a ninth aspect, alone or in combination with one or more of the above aspects, the information is further configured to indicate that a reference precoding matrix is to be used for post processing by the wireless communication device, and the UE 115 further performs post processing for the at least one future transmission based on the reference precoding matrix.

In a tenth aspect, alone or in combination with one or more of the above aspects, the UE 115 receives a particular transmission of the at least one future transmission, where the particular transmission is a millimeter wave transmission.

In an eleventh aspect, alone or in combination with one or more of the above aspects, the UE 115 receives a particular transmission of the at least one future transmission, where in-band interference of the particular transmission is reduced by utilizing the precoding matrix used for precoding for post processing.

In a twelfth aspect, alone or in combination with one or more of the above aspects, the UE 115 receives a particular transmission of the at least one future transmission, where an out-of-band interference of the particular transmission is below 15 decibels.

In a thirteenth aspect, alone or in combination with one or more of the above aspects, the UE 115 receives a particular transmission of the at least one future transmission, where the particular transmission is a single user multi-input multi-output (SU MIMO) communication.

In a fourteenth aspect, alone or in combination with one or more of the above aspects, the first message is a control message.

In a fifteenth aspect, alone or in combination with one or more of the above aspects, the control message includes a channel state frequency (CSF) report, a radio resource control (RRC) message, or uplink control information (UCI).

In a sixteenth aspect, alone or in combination with one or more of the above aspects, the second message is a control message.

In a seventeenth aspect, alone or in combination with one or more of the above aspects, the control message is or includes a radio resource control (RRC) message or downlink control information (DCI).

In an eighteenth aspect, alone or in combination with one or more of the above aspects, the UE 115 receives a particular transmission of the at least one future transmission, where the second message is received separate from the particular transmission and was precoded based on the particular precoding matrix.

In a nineteenth aspect, alone or in combination with one or more of the above aspects, the particular transmission is a data transmission.

In a twentieth aspect, alone or in combination with one or more of the above aspects, the data transmission is or includes a physical downlink shared channel (PDSCH), a channel state information reference signal (CSI-RS), a physical uplink shared channel (PUSCH), or a sounding reference signal (SRS).

In a twenty-first aspect, alone or in combination with one or more of the above aspects, the second message is received with data that has been precoded based on the particular precoding matrix.

In a twenty-second aspect, alone or in combination with one or more of the above aspects, the UE receives a third message indicating a second precoding matrix identifier, the second precoding matrix identifier configured to identify a second particular precoding matrix for precoding by the wireless communication device for at least one second future transmission, determines whether to use the second particular precoding matrix for a second particular transmission, processes second data based on the second particular planned precoding matrix to generate processed second data, transmits a fourth message indicating second information about whether the second particular precoding matrix will be used for a second transmission, and transmits the second transmission based on the processed second data, where the information indicates that the particular planned precoding matrix was used to generate the second transmission and that post processing should be performed by the other wireless communication device.

In a twenty-third aspect, alone or in combination with one or more of the above aspects, the UE 115 retrieves matrix values from a precoding matrix table based on the information, estimates transmission non-linear interference for a particular transmission based on the matrix values to generate an estimated non-linearity value, and processes the particular transmission based on the estimated non-linearity value to correct for non-linear distortion.

In a twenty-fourth aspect, alone or in combination with one or more of the above aspects, the UE 115 estimates non-linear distortion caused by transmitter side precoding based on the precoding matrix and a pilot signal, where the pilot signal includes a tracking reference signal (TRS), a demodulation reference signal (DMRS), or both.

In a twenty-fifth aspect, alone or in combination with one or more of the above aspects, prior to transmitting the first message, the UE 115 transmits a capabilities message indicating that the wireless communication device is configured for precoding matrix identification confirmation.

In a twenty-sixth aspect, alone or in combination with one or more of the above aspects, prior to transmitting the first message, the UE 115 receives a message from the other wireless communication device to operate in a precoding matrix identification confirmation mode.

Accordingly, a wireless communication device, such as a UE or a base station, may perform PMI confirmation for wireless communication. By utilizing PMI confirmation, improved transmission efficiency can be achieved. For example, wireless communication devices may use less power to transmit and receive such communications and/or use less power to encode and decode information to be transmitted. Consequently, processing power and battery power usage may be reduced and throughput and reliability may be increased.

Figure 9:
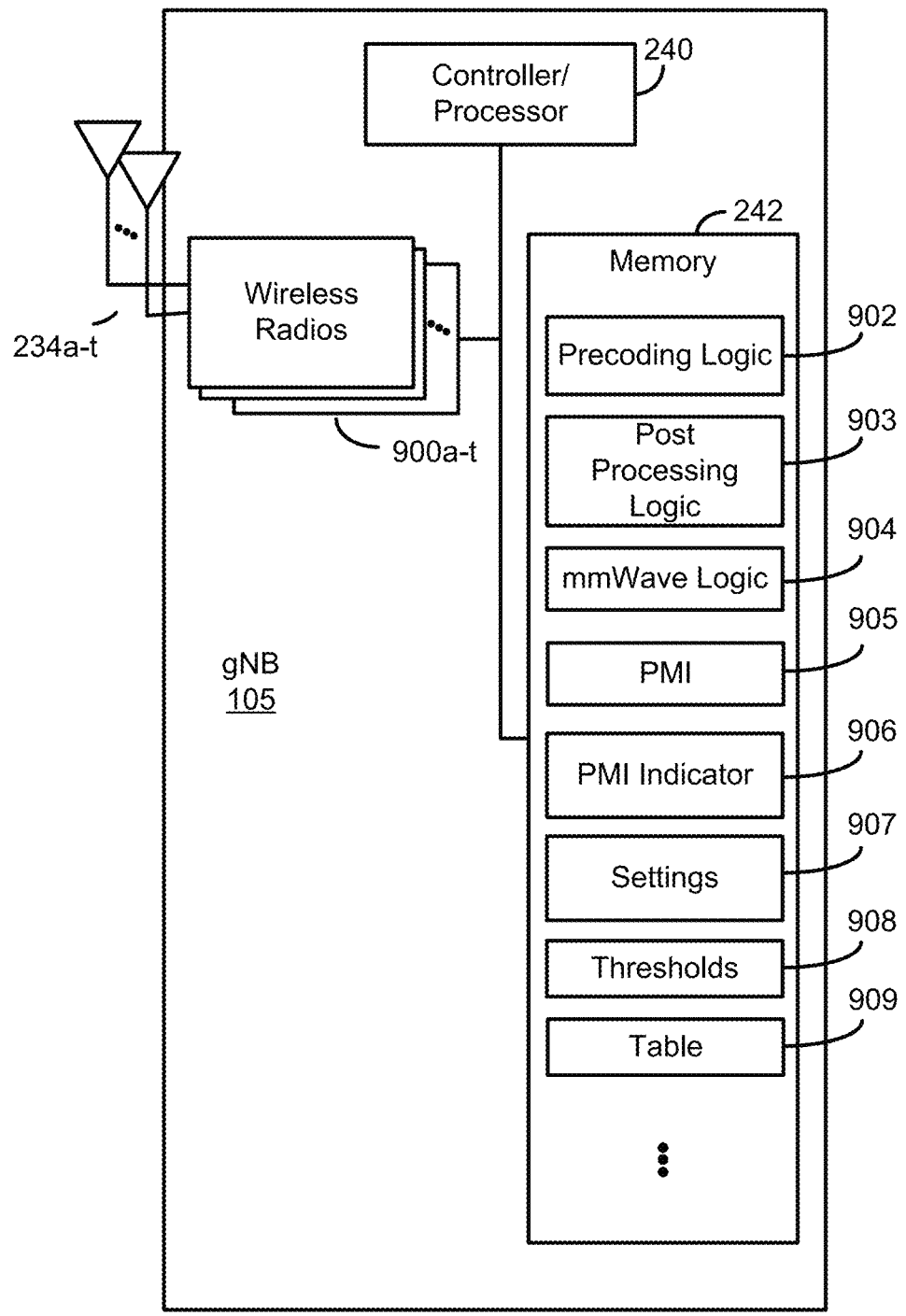
FIG. 9 is a block diagram conceptually illustrating a design of a network entity according to some embodiments of the present disclosure.

FIG. 7 is a block diagram illustrating example blocks executed by a wireless network entity configured according to an aspect of the present disclosure. The example blocks will also be described with respect to gNB 105 as illustrated in FIG. 9. However, another wireless communication device, such as UE 115, may execute such blocks. At block 700, a wireless communication device, such as a gNB 105, receives a first message indicating a precoding matrix identifier, the precoding matrix identifier configured to identify a particular precoding matrix for precoding for at least one future transmission. For example, the gNB 105 receives a first message as described with reference to FIG. 6, such as first message 362.

The gNB 105 may execute, under control of controller/processor 280, precoding logic 902, stored in memory 284. The execution environment of precoding logic 902 provides the functionality for the gNB 105 to define and perform the PMI confirmation procedures. Additionally, the gNB 105 may execute one or more of post processing logic 903 or mmWave logic 904. The execution environment of precoding logic 902 (and optionally post processing logic 903 or mmWave logic 904) defines the different PMI confirmation processes, such as determining to perform PMI confirmation, determining a precoding matrix, selecting a PMI for the precoding matrix, transmitting the PMI to another device, or a combination thereof. To illustrate, gNB 105 may determine to operate in a particular PMI confirmation mode based on a configuration message.

At block 701, the gNB 105 transmits a second message indicating information about whether the particular precoding matrix was or will be used for the at least one future transmission. For example, the gNB 105 transmit a transmission, such as second message 364, via wireless radios 900*a-t* and antennas 254*a-t*. The second message 364 includes PMI confirmation information, PMI indicator 394, and the PMI confirmation information is configured to indicate whether the PMI indicated by the first message 362 was used to precode the second message, precode one or more future messages, or both. The PMI confirmation information may additionally be configured to indicate an alternative PMI. The PMI confirmation information may have different forms or types, such as described with reference to FIGS. 3 and 4.

The gNB 105 may execute additional blocks (or the gNB 105 may be configured further perform additional operations) in other implementations. For example, the gNB 105 may perform precoding based on the PMI, the PMI confirmation information, or both. To illustrate, the gNB 105 may perform DPoD based on the PMI confirmation information. In a particular implementation, the UE 115 uses the precoding matrix identified by the PMI confirmation information to perform DPoD and to correct for transmission non-linear distortion. As another illustration, the gNB 105 may determine whether to use the precoding matrix identified by the PMI from UE 115, and may precode data based on the determination, such as based on the signaled precoding matrix or a second precoding matrix. Additionally, or alternatively, the gNB 105 may perform one or more operations described above.

For example, the gNB 105 may determine whether to use the particular planned precoding matrix for a particular transmission. The gNB 105 may also process first data based on the particular planned precoding matrix to generate processed first data, and transmit a first transmission based on the processed first data. The information of the second message indicates that the particular planned precoding matrix was used to generate the first transmission and that post processing should be performed by a receiving device. As another example, the gNB 105 may determine whether to use the particular planned precoding matrix for a particular transmission. The gNB 105 may also process first data based on a second precoding matrix to generate processed first data, the second precoding matrix different from the particular planned precoding matrix, and transmit a first transmission based on the processed first data. The information indicates that the particular planned precoding matrix was not used to generate the first transmission.

As another example, the base station 105 may perform one or more aspects described below and/or with reference to FIG. 7. In a first aspect, the base station 105 performs the precoding for the at least one future transmission based on the information indicated by the second message.

In a second aspect, alone or in combination with one or more of the above aspects, the base station 105 performs precoding for the at least one future transmission based on the precoding matrix identifier and the information indicated by the second message.

In a third aspect, alone or in combination with one or more of the above aspects, the base station 105 determines whether to use the particular planned precoding matrix for a particular transmission, processes first data based on the particular planned precoding matrix to generate processed first data, and transmits a first transmission based on the processed first data, where the information indicates that the particular planned precoding matrix was used to generate the first transmission and that post processing should be performed by a receiving device.

In a fourth aspect, alone or in combination with one or more of the above aspects, the base station 105 determines whether to use the particular planned precoding matrix for a particular transmission, processes first data based on a second precoding matrix to generate processed first data, the second precoding matrix different from the particular planned precoding matrix, and transmits a first transmission based on the processed first data, where the information indicates that the particular planned precoding matrix was not used to generate the first transmission.

In a fifth aspect, alone or in combination with one or more of the above aspects, the information is further configured to indicate no post processing is to be performed by a receiving device.

In a sixth aspect, alone or in combination with one or more of the above aspects, the information is further configured to indicate that a reference PMI is to be used for post processing by a receiving device.

In a seventh aspect, alone or in combination with one or more of the above aspects, the information includes a second precoding matrix identifier or matrix.

In an eighth aspect, alone or in combination with one or more of the above aspects, the base station 105 generates a transmission corresponding to the second message independent of predistortion processing (DPD).

In a ninth aspect, alone or in combination with one or more of the above aspects, the base station 105 performs predistortion processing (DPD) to generate a transmission corresponding to the second message.

Accordingly, a wireless communication device, such as a UE or a base station, may perform PMI confirmation for wireless communication. By utilizing PMI confirmation, improved transmission efficiency can be achieved. For example, wireless communication devices may use less power to transmit and receive such communications and/or use less power to encode and decode information to be transmitted. Consequently, processing power and battery power usage may be reduced and throughput and reliability may be increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to enhanced digital post distortion may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 6 and 7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in random access memory (RAM), flash memory, read-only memory (ROM), electronically erasable programmable read-only memory (EEPROM), registers, a hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
    transmitting, by a wireless communication device, a first message indicating a precoding matrix identifier, the precoding matrix identifier configured to identify a particular precoding matrix for precoding by another wireless communication device for at least one future transmission for reception by the wireless communication device;
    receiving, by the wireless communication device, a second message indicating information about whether the particular precoding matrix was or will be used by the other wireless communication device for the at least one future transmission for reception by the wireless communication device; and
    performing, by the wireless communication device, digital post distortion (DPoD) processing on a received particular transmission of the at least one future transmission based on the information indicated by the second message.

2. The method of claim 1, wherein the information comprises precoding matrix identifier (PMI) confirmation information.

3. The method of claim 1, wherein DPoD processing on the received particular transmission of the at least one future transmission based on the information indicated by the second message comprises performing the DPoD processing based on the particular precoding matrix.

4. The method of claim 1, further comprising performing channel estimation procedures, time averaging procedures, or a combination thereof, based on the information indicated by the second message.

5. The method of claim 1, wherein the information comprises a one bit identifier.

6. The method of claim 1, wherein the information comprises a second precoding matrix identifier configured to indicate a second precoding matrix for precoding, wherein the second precoding matrix is different from the particular precoding matrix, and wherein the second precoding matrix was used in precoding of the received particular transmission by the other wireless communication device.

7. The method of claim 1, wherein the information comprises second precoding matrix data, the second precoding matrix data indicates a plurality of matrix values for a second precoding matrix that is different from the particular precoding matrix.

8. The method of claim 1, further comprising:
    transmitting, by the wireless communication device, a third message indicating a second precoding matrix identifier, the second precoding matrix identifier configured to identify a second particular precoding matrix for precoding by the other wireless communication device for a second future transmission for reception by the wireless communication device;

receiving, by the wireless communication device, a fourth message indicating second information that the second particular precoding matrix was not or will not be used by the other wireless communication device for the second future transmission for reception by the wireless communication device, wherein the second information is further configured to indicate that no DPoD processing is to be performed by the wireless communication device for the second future transmission; and refraining, by the wireless communication device, from performing second DPoD processing of the second future transmission based on the second information.

9. The method of claim 1, wherein the information is further configured to indicate that a reference precoding matrix is to be used for the DPoD processing on the received particular transmission by the wireless communication device, and further comprising performing the DPoD processing on the received particular transmission based on the reference precoding matrix.

10. The method of claim 1, wherein the information is further configured to indicate that that no digital pre-distortion processing (DPD) was performed by the other wireless communication device for the received particular transmission of the at least one future transmission.

11. An apparatus configured for wireless communication, the apparatus comprising:
at least one processor; and
a memory coupled to the at least one processor, wherein the at least one processor is configured:
to transmit, by a wireless communication device, a first message indicating a precoding matrix identifier, the precoding matrix identifier configured to identify a particular precoding matrix for precoding by another wireless communication device for at least one future transmission for reception by the wireless communication device;
to receive, by the wireless communication device, a second message indicating information about whether the particular precoding matrix was or will be used by the other wireless communication device for the at least one future transmission for reception by the wireless communication device; and
perform, by the wireless communication device, digital post distortion (DPoD) processing on a received particular transmission of the at least one future transmission based on the information indicated by the second message.

12. The apparatus of claim 11, wherein the at least one processor is further configured:
to receive, by the wireless communication device, the received particular transmission of the at least one future transmission, wherein the received particular transmission is a single user multi-input multi-output (SU MIMO) communication.

13. The apparatus of claim 11, wherein the first message comprises a control message, and wherein the control message comprises a channel state frequency (CSF) report, a radio resource control (RRC) message, or uplink control information (UCI).

14. The apparatus of claim 11, wherein the second message comprises a control message, and wherein the control message comprises a radio resource control (RRC) message or downlink control information (DCI).

15. The apparatus of claim 11, wherein the at least one processor is further configured:
to receive, by the wireless communication device, the received particular transmission of the at least one future transmission, wherein the second message is received separate from the received particular transmission and was precoded based on the particular precoding matrix.

16. The apparatus of claim 15, wherein the received particular transmission comprises a data transmission, and wherein the data transmission comprises a physical downlink shared channel (PDSCH), a channel state information reference signal (CSI-RS), a physical uplink shared channel (PUSCH), or a sounding reference signal (SRS).

17. The apparatus of claim 11, wherein the second message is received with data that has been precoded based on the particular precoding matrix.

18. The apparatus of claim 11, wherein the at least one processor is further configured:
to receive, by the wireless communication device, a third message indicating a second precoding matrix identifier, the second precoding matrix identifier configured to identify a second particular precoding matrix for precoding by the wireless communication device for at least one second future transmission for transmission by the wireless communication device;
to determine, by the wireless communication device, whether to use the second particular precoding matrix for a second particular transmission of the least one second future transmission;
to process, by the wireless communication device, second data based on the second particular precoding matrix to generate processed second data;
to transmit, by the wireless communication device, a fourth message indicating second information about whether the second particular precoding matrix will be used by the wireless communication device for precoding the second particular transmission; and
to transmit, by the wireless communication device, the second particular transmission based on the processed second data, wherein the second information indicates that the second particular precoding matrix was used to generate the second particular transmission and that second DPoD processing should be performed by the other wireless communication device on the second particular transmission.

19. The apparatus of claim 11, wherein, to perform the DPoD processing, the at least one processor is configured:
to retrieve, by the wireless communication device, matrix values from a precoding matrix table based on the information;
to estimate, by the wireless communication device, transmission non-linear interference for the received particular transmission based on the matrix values to generate an estimated non-linearity value; and
to process, by the wireless communication device, the received particular transmission based on the estimated non-linearity value to correct for non-linear distortion.

20. The apparatus of claim 11, wherein the at least one processor is further configured:
to estimate, by the wireless communication device, non-linear distortion caused by transmitter side precoding based on the precoding matrix and a pilot signal, wherein the pilot signal includes a tracking reference signal (TRS), a demodulation reference signal (DMRS), or both.

21. A method of wireless communication comprising:
receiving, by a wireless communication device, a first message indicating a precoding matrix identifier, the precoding matrix identifier configured to identify a particular precoding matrix for precoding by the wireless communication device for at least one future transmission by the wireless communication device; and transmitting, by the wireless communication device, a second message indicating information about whether the particular precoding matrix was or will be used for precoding for the at least one future transmission by the wireless communication device, wherein the information indicates whether the particular precoding matrix was or will be used for a particular transmission of the at least one future transmission by the wireless communication device, wherein the information is configured to enable a receiving wireless communication device to perform digital post distortion (DPoD) processing on the particular transmission based on the information indicated by the second message.

22. The method of claim 21, further comprising performing the precoding for the at least one future transmission based on the information indicated by the second message.

23. The method of claim 21, further comprising performing the precoding for the at least one future transmission based on the precoding matrix identifier and the information indicated by the second message.

24. The method of claim 21, further comprising:
determining, by the wireless communication device, whether to use the particular planned precoding matrix for the particular transmission;
processing, by the wireless communication device, first data based on the particular planned precoding matrix to generate processed first data; and
transmitting, by the wireless communication device, a first transmission based on the processed first data, wherein the information indicates that the particular planned precoding matrix was used to generate the first transmission and that the DPoD processing should be performed by a receiving device on the particular transmission.

25. The method of claim 21, further comprising:
receiving, by the wireless communication device, a third message indicating a second precoding matrix identifier, the second precoding matrix identifier configured to identify a second particular precoding matrix for precoding by the wireless communication device for at least one second future transmission;
receiving, by the wireless communication device, a fourth message indicating second information about whether the second particular precoding matrix was used or will be used for a second future transmission;
determining, by the wireless communication device, the second particular precoding matrix based on the second information;
receiving, by the wireless communication device, a second transmission corresponding to the fourth message; and
performing, by the wireless communication device, second DPoD processing based on matrix values of the second particular precoding matrix.

26. The method of claim 21, further comprising:
generating the particular transmission of the at least one future transmission independent of digital pre-distortion processing (DPD).

27. An apparatus configured for wireless communication, the apparatus comprising:
at least one processor; and
a memory coupled to the at least one processor, wherein the at least one processor is configured:
to receive, by a wireless communication device, a first message indicating a precoding matrix identifier, the precoding matrix identifier configured to identify a particular precoding matrix for precoding by the wireless communication device for at least one future transmission by the wireless communication device; and
to transmit, by the wireless communication device, a second message indicating information about whether the particular precoding matrix was or will be used for precoding for the at least one future transmission by the wireless communication device,
wherein the information indicates whether the particular precoding matrix was or will be used for a particular transmission of the at least one future transmission by the wireless communication device, wherein the information is configured to enable a receiving device to perform digital post distortion (DPoD) processing on the particular transmission based on the information indicated by the second message.

28. The apparatus of claim 27, wherein the at least one processor is further configured:
to determine, by the wireless communication device, whether to use the particular planned precoding matrix for a second particular transmission of the at least one future transmission;
to process, by the wireless communication device, first data based on a second precoding matrix to generate processed first data, the second precoding matrix different from the particular planned precoding matrix; and
to transmit, by the wireless communication device, a first transmission based on the processed first data, wherein the information indicates that the particular planned precoding matrix was not used by the wireless communication device to generate the first transmission.

29. The apparatus of claim 28, wherein the information is further configured to indicate no DPoD processing is to be performed by the receiving device on the second particular transmission.

30. The apparatus of claim 28, wherein the information is further configured to indicate that a reference precoding matrix identifier (PMI) is to be used for second DPoD processing on the second particular transmission by the receiving device or the information comprises a second precoding matrix identifier or the second precoding matrix.

* * * * *